US005636152A

United States Patent [19]
Yang et al.

[11] Patent Number: 5,636,152
[45] Date of Patent: Jun. 3, 1997

[54] TWO-DIMENSIONAL INVERSE DISCRETE COSINE TRANSFORM PROCESSOR

[75] Inventors: Jar-Ferr Yang, Tainan; Shih-Chang Hisa, Chang-Hwa Hsien; Chyou-Hsiung Hwang, Hsinchu; Zhi-Hsien Chen, Hsinchu Hsien, all of Taiwan

[73] Assignees: United Microelectronics Corporation; National Cheng Kung University, both of Taiwan

[21] Appl. No.: 431,268

[22] Filed: Apr. 28, 1995

[51] Int. Cl.⁶ .................................................. G06F 17/14
[52] U.S. Cl. ................................. 364/725; 382/248
[58] Field of Search ................... 364/725, 726, 364/727, 736, 754; 375/240; 381/29, 34; 382/232, 248

[56] References Cited

U.S. PATENT DOCUMENTS

| | | | |
|---|---|---|---|
| 4,829,465 | 5/1989 | Knauer et al. | 364/725 |
| 5,291,429 | 3/1994 | Iwama et al. | 364/725 |
| 5,301,136 | 4/1994 | McMillan, Jr. et al. | 364/725 |
| 5,471,412 | 11/1995 | Shyu | 364/725 |

*Primary Examiner*—Tan V. Mai
*Assistant Examiner*—Emmanual L. Moise
*Attorney, Agent, or Firm*—Cushman Darby & Cushman, IP Group of Pillsbury Madison & Sutro, LLP

[57] ABSTRACT

A two-dimensional inverse discrete cosine transform (2-D IDCT) processor comprises cosine angle index generators, pipelined multipliers and a symmetrical kernel. The 2-D IDCT processor of the invention has a five-stage pipelined structure for carrying out a coefficient-by-coefficient 2-D IDCT algorithm and can be operated at a clock rate of more than 50 MHz to achieve a pixel rate of about 400 MHz.

16 Claims, 12 Drawing Sheets

FIG. 13

TWO-DIMENSIONAL INVERSE DISCRETE COSINE TRANSFORM PROCESSOR

BACKGROUND OF THE INVENTION

1. Field of the Invention

The invention relates to a data processing apparatus. More particularly, the invention provides a circuit for processing signals so as to carry out an inverse discrete cosine transform (IDCT) of input data.

2. Description of Related Art

Discrete cosine transform (DCT) and IDCT are used in many types of systems for processing data. One common use is in video technology. DCT and IDCT are specified in various standards for compressing image signals because they demonstrate good energy compactness and low computational complexity. The standards, such as the CCITT H.261 standard for video telephony and teleconferencing, JPEG (Joint Photographic Experts Group) for color still image transmission, MPEG (Moving Picture Experts Group) standard for moving pictures on a storage media, and the standard for future HDTV systems, utilize the DCT/IDCT to encode and decode the image data. Therefore, a high speed DCT/IDCT processor has become a key component in image compression VLSI (Very large scale integrated) circuits.

In the past, most two-dimensional (2-D) DCT/IDCT algorithms have been implemented by using equivalent 1-D DCT/IDCT processing units for VLSI implantation. A so-called row-column decomposition, in which row data is calculated and transposed to a transposition RAM for providing transposed data to another 1-D DCT processing unit, has modular structure, thus facilitating hardware implantation. Since direct fast 2-D DCT/IDCT algorithms are too complex for implementation, there is no reference in the literature to chips that implement direct fast 2-D DCT/IDCT algorithms. However, DCT/IDCT computation using row-column decomposition is less efficient than a direct fast 2-D DCT/IDCT computation, that is, the encoding and decoding speed of the image compression VLSI can be improved by employing the direct fast 2-D DCT/IDCT algorithms instead of traditional 1-D DCT/IDCT computations.

Since there is no DCT computation in a video decoder, only the IDCT function is designed into the video decoder. Moreover, since the decoder requires a larger volume than that of an encoder and the IDCT computation is the most complicated part in the decoder, efficient 2-D IDCT computation is necessary in the video decoder. Therefore, the realization of 2-D IDCT algorithms has become the key technology in the development of high speed video decoders.

On the other hand, since row/column decomposition is a sequential operation which can not skip zero coefficients, the IDCT processing has lower efficiency. Therefore, the pixel rate of the conventional IDCT processor is generally equal or lower than a clock rate. However, since digital HDTV requires real time operation at a pixel rate of about 80–100 MHz, the prior art technology is not satisfactory. Thus, there is a great need for an IDCT processor which operates at a lower frequency but attains a very high pixel rate to meet the requirement of digital HDTV.

Furthermore, there is a need for a 2-D IDCT processor which can be fabricated in a chip by well-developed standard semiconductor fabrication techniques to reduce the manufacturing cost.

SUMMARY OF THE INVENTION

Accordingly, the present invention provides a VLSI architecture which carries out 2-D IDCT algorithms. The invention therefore improves upon previously available 2-D IDCT computational efficiency.

The present invention also provides a VLSI architecture for circuitry which carries out a 2-D IDCT algorithm in a chip that can be easily manufactured by presently available low cost CMOS technology.

The 2-D IDCT processor according to the invention has a parallel and pipelined VLSI architecture to realize the coefficient-by-coefficient 2-D IDCT algorithm. The 2-D IDCT processor, which comprises cosine angle index generators, pipelined multipliers and symmetrical kernel modules, is implemented with CMOS technology in a reasonable die size.

The 2-D IDCT processor of the invention has a five-stage pipelined structure and can be operated at a clock rate of more than 50 MHz. As compared with row/column decomposition, which is designed in a 128-stage pipeline, the present invention has a processing rate about 25 times faster.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

The 2-D IDCT algorithm that is carried out by the processor apparatus according to the invention will first be explained. Understanding the algorithm itself will make it easier to understand the processor apparatus according to the invention that carries out the algorithm. What is being patented herein is one particular apparatus that is used to carry out the algorithm. The algorithm itself is not being patented.

First of all, if $\underline{F}$ is an IDCT coefficient matrix, the N×N 2-D IDCT with each subimage $\underline{f}$ can be represented as $$f_{ij} = \frac{2}{N} \sum_{u=0}^{N-1} \sum_{v=0}^{N-1} C_u C_v F_{uv} \cos\left(\frac{(2i+1)u\pi}{2N}\right) \cos\left(\frac{(2j+1)v\pi}{2N}\right), \quad (1)$$

where $f_{ij}$ is the ith row and jth column element of the subimage $\underline{f}$, $F_{uv}$ is the uth row and vth column element of the DCT coefficient matrix, $\underline{F}$. That is, u and v are coordinate parameters of Hereafter, $f_{ij}$ is called the (i,j)th element of $\underline{f}$ and $F_{uv}$ is called the (u,v)th element Of $\underline{F}$. The constants $C_u$ and $C_v$ are defined as $$C_w = \begin{cases} 1/\sqrt{2} & \text{for } w = 0 \\ 1 & \text{for } w \neq 0 \end{cases} \quad (20)$$

The direct computation in Eq. (1) requires $2N^2$ multiplications and $(N^2-N)$ additions to obtain a pixel data $f_{ij}$. Therefore, $2N^4$ multiplications and $(N^4-N^2)$ additions are necessary for the computation of the complete N×N block from the 2-D IDCT coefficients.

By using the coefficient-by-coefficient approach, the 2-D IDCT can be expressed by $$\underline{f} = \sum_{u=0}^{N-1} \sum_{v=0}^{N-1} F_{uv} \underline{C}^{uv} \quad (2)$$

where $\underline{C}^{uv}$, which is treated as the computational kernel matrix of $F_{uv}$, is composed of the (j,k)th element expressed as $$C_{jk}^{uv} = \frac{2}{N} C_u C_v \cos\left(\frac{(2j+1)u\pi}{2N}\right) \cos\left(\frac{(2k+1)v\pi}{2N}\right), \quad (3)$$

Then, the complete result of the 2-D IDCT in Eq. (2) can be obtained by summing up all the one-coefficient-only results, $F_{uv}\underline{C}^{uv}$ for all u, v=0, 1, ..., (N-1). If some of $F_{uv}$ are zeros, we can skip all the computations. Since $\underline{C}^{uv}$ possesses the absolute horizontal, vertical, and center symmetrical properties, the kernel matrix of $F_{uv}$ can be divided into four parts as $$\underline{C}^{uv} = \begin{bmatrix} \underline{C}_1^{uv} & \underline{C}_2^{uv} \\ \underline{C}_3^{uv} & \underline{C}_4^{uv} \end{bmatrix} \quad (4)$$

where the subkernel matrices $\underline{C}_2^{uv}$, $\underline{C}_3^{uv}$, and $\underline{C}_4^{uv}$ can be depicted by the subkernel matrix, $\underline{C}_1^{uv}$. Thus, the symmetrical properties yield $$\underline{C}_2^{uv} = (-1)^v \underline{C}_1^{uv}, \quad (5)$$

$$\underline{C}_3^{uv} = (-1)^u \underline{C}_1^{uv}, \quad (6)$$

and $$\underline{C}_4^{uv} = (-1)^{u+v} \underline{C}_1^{uv}, \quad (7)$$

for j,k=0, 1, 2, ..., $$\left(\frac{N}{2} - 1\right).$$

Thus, the computation of $F_{uv}\underline{C}^{uv}$ actually can be completed by only the calculation of $F_{uv}\underline{C}_1^{uv}$. The computation of the remaining three submatrices can be directly obtained from $F_{uv}\underline{C}_1^{uv}$ by the proper sign changes shown in Eq. (5), (6) and (7), which are determined by the least significant bit of the frequency indices, u and v.

Since the (j, k) th element of the first subkernel matrix $\underline{C}_1^{uv}$ can be further split into two parts as $$C_{jk}^{uv} = \frac{1}{N} C_u C_v \left\{ \cos\left(\frac{[(2j+1)u + (2k+1)v]\pi}{2N}\right) + \cos\left(\frac{[(2i+1)u - (2j+1)v]\pi}{2N}\right) \right\} \quad (8)$$

$$= C_{+jk}^{uv} + C_{-jk}^{uv},$$

where $$C_{+jk}^{uv} = \frac{1}{N} C_u C_v \cos\left(\frac{[(2j+1)u + (2k+1)v]\pi}{2N}\right) \quad (9)$$

and $$C_{-jk}^{uv} = \frac{1}{N} C_u C_v \cos\left(\frac{[(2i+1)u - (2j+1)v]\pi}{2N}\right). \quad (10)$$

If the integer number is defined as $$M_q^w = \begin{cases} (2q+1)w & \text{for } w \neq 0 \\ N/2 & \text{for } w = 0 \end{cases}, \quad (11)$$

the addition-subtraction forms in Eq. (8) and (9) can be rewritten as $$C_{+jk}^{uv} = \frac{1}{N} \cos\left(\frac{\pi(M_j^u + M_k^v)}{2N}\right) = \frac{1}{N} \cos\left(\frac{\pi M_{+jk}^{uv}}{2N}\right) \quad (12)$$

and $$C_{-jk}^{uv} = \frac{1}{N} \cos\left(\frac{\pi(M_j^u - M_k^v)}{2N}\right) = \frac{1}{N} \cos\left(\frac{\pi M_{-jk}^{uv}}{2N}\right), \quad (13)$$

where $$M_{+jk}^{uv} = M_j^u + M_k^v \quad (14)$$

and $$M_{-jk}^{uv} = M_j^u + M_k^v \quad (15)$$

are also integer numbers. The original computation of $F_{uv}\underline{C}_1^{uv}$ is composed of $$F_{uv}C_{jk}^{uv} = F_{uv}C_{+jk}^{uv} + F_{uv}C_{-jk}^{uv} \text{ for } j,k=0,1, \ldots, \quad (16)$$

$$\left(\frac{N}{2} - 1\right).$$

By using the basic properties of the cosine function, the values of $C_{+jk}^{uv}$ and $C_{-jk}^{uv}$ can be obtained from $$\left\{ 1, \cos\frac{\pi}{2N}, \cos\frac{2\pi}{2N}, \ldots, \cos\frac{(N-1)\pi}{2N} \right\}.$$

A positive angle index and a negative angle index are defined as $M_{+jk}^{uv} = (2j+1)u + (2k+1)v$ and $M_{-jk}^{uv} = (2j+1)u - (2k+1)v$ respectively. If u and v are all even or odd numbers, the positive and negative angle indices will be even, otherwise the positive and negative angle indices will be odd numbers. Thus, the values of $C_{+jk}^{uv}$ and $C_{-jk}^{uv}$ can be obtained from $$\left\{ \cos\frac{\pi}{2N}, \cos\frac{3\pi}{2N}, \ldots, \cos\frac{(N-1)\pi}{2N} \right\}$$

or $$\left\{ 1, \cos\frac{2\pi}{2N}, \ldots, \cos\frac{(N-2)\pi}{2N} \right\}$$

followed by a $\log_2 N$-bit shifting. $M_{+jk}{}^{uv}$ and $M_{-jk}{}^{uv}$ can be used as the indices of selectors, and the value of $F_{uv}C_1{}^{uv}$ is obtained from $$\left\{ F_{uv}\cos\frac{\pi}{2N}, F_{uv}\cos\frac{3\pi}{2N}, \ldots, F_{uv}\cos\frac{(N-1)\pi}{2N} \right\}$$

or $$\left\{ F_{uv}, F_{uv}\cos\frac{2\pi}{2N}, \ldots, F_{uv}\cos\frac{(N-2)\pi}{2N} \right\}.$$

There will now be described a 2-D IDCT processor according to one embodiment of the present invention. It is structured so as to carry out the algorithm described above including the afore-mentioned characteristics and symmetrical properties.

Figure 1:
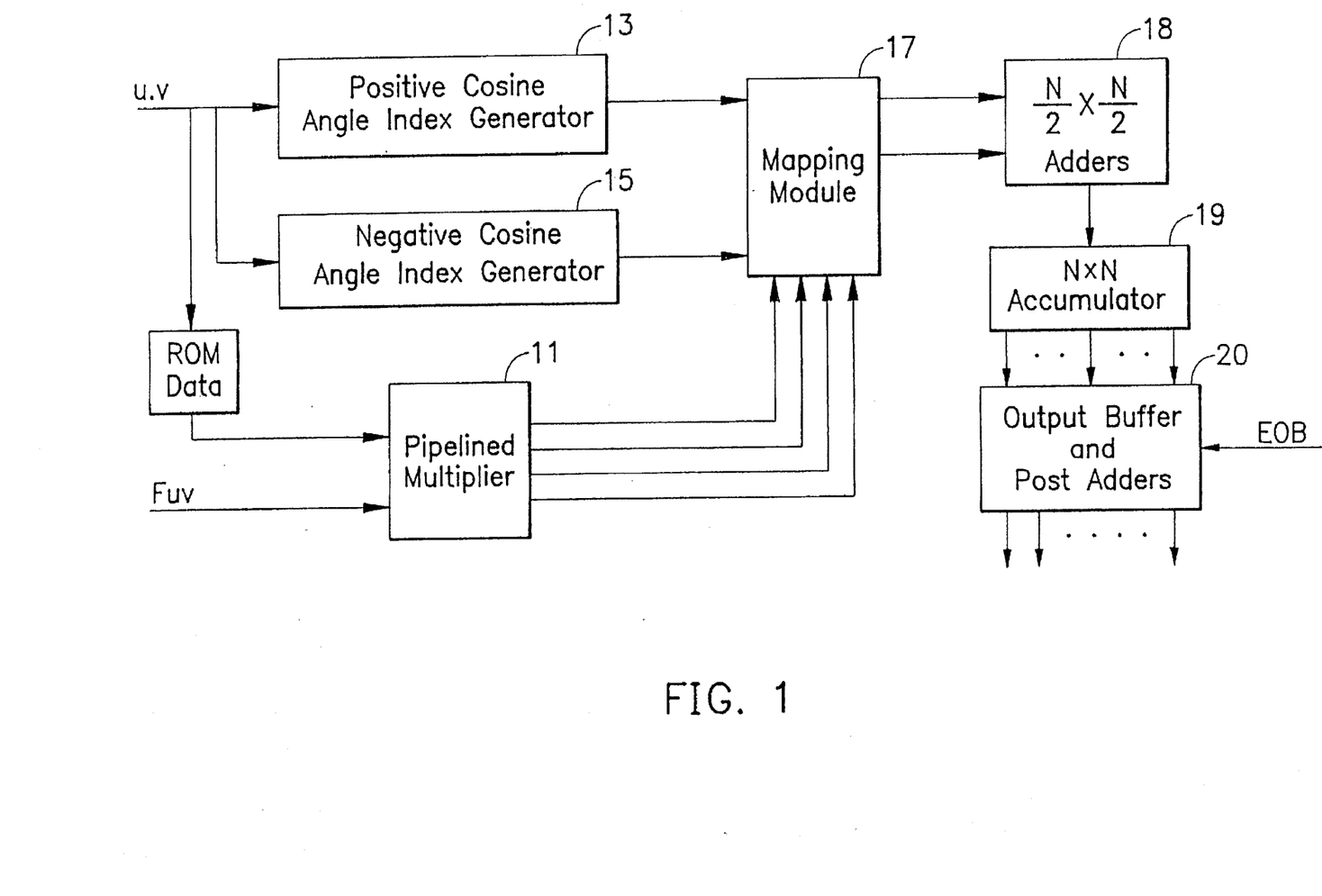
FIG. 1 is a functional block diagram of the 2-D IDCT processor according to the invention.

FIG. 1 is a functional block of the 2-D IDCT processor. The 2-D IDCT processor comprises a pipelined multiplier 11, a positive cosine angle index generator 13 a negative cosine angle index generator 15, a mapping module 17, a plurality of adders 18, a plurality of accumulators 19 and output buffers 20.

The 2-D IDCT processor has three input values, that is, non-zero coefficient $F_{uv}$ and the corresponding indices u and v (shown in the drawing as u.v). Pipelined multiplier 11 multiplies Fur with ROM data that is based on input values u and v. Then four output data, data[S] for S=MOD(N/2), can be expressed as $$\text{data}[S] = F_{uv}\cos\frac{N\pi}{2N} \qquad N = 0 \text{ to } 7. \tag{17}$$

The four data, indicated by the four output lines from pipelined multiplier 11, are mapped to the positive and negative angle indices by mapping module 17. The computation of $F_{uv}C_1{}^{uv}$ in Eq.(16) is carried out by $$\frac{N}{2} \times \frac{N}{2}$$

adders 18 for parallel processing. Then the computation results, that is, $$\frac{N}{2} \times \frac{N}{2}$$

transformed data $T_{jk}$ are successively accumulated in accumulators 19 which contain N×N cells. Based on the symmetrical properties of Eq.(4),(5),(6) and (7), N×N transformed data $T_{jk}$, where $T_{jk}=F_{uv}C_{jk}{}^{uv}$, are obtained in a clock time and are accumulated in accumulators 19. When an EOB signal is applied to the 2-D IDCT processor, the transformed data are loaded into output buffers 20 and accumulators 19 are cleared for the next blocks. In order to increase the processing efficiency to satisfy the requirements of real time operation, eight ports having the same afore-mentioned processing flows can be arranged in parallel to transform image data.

Figure 2:
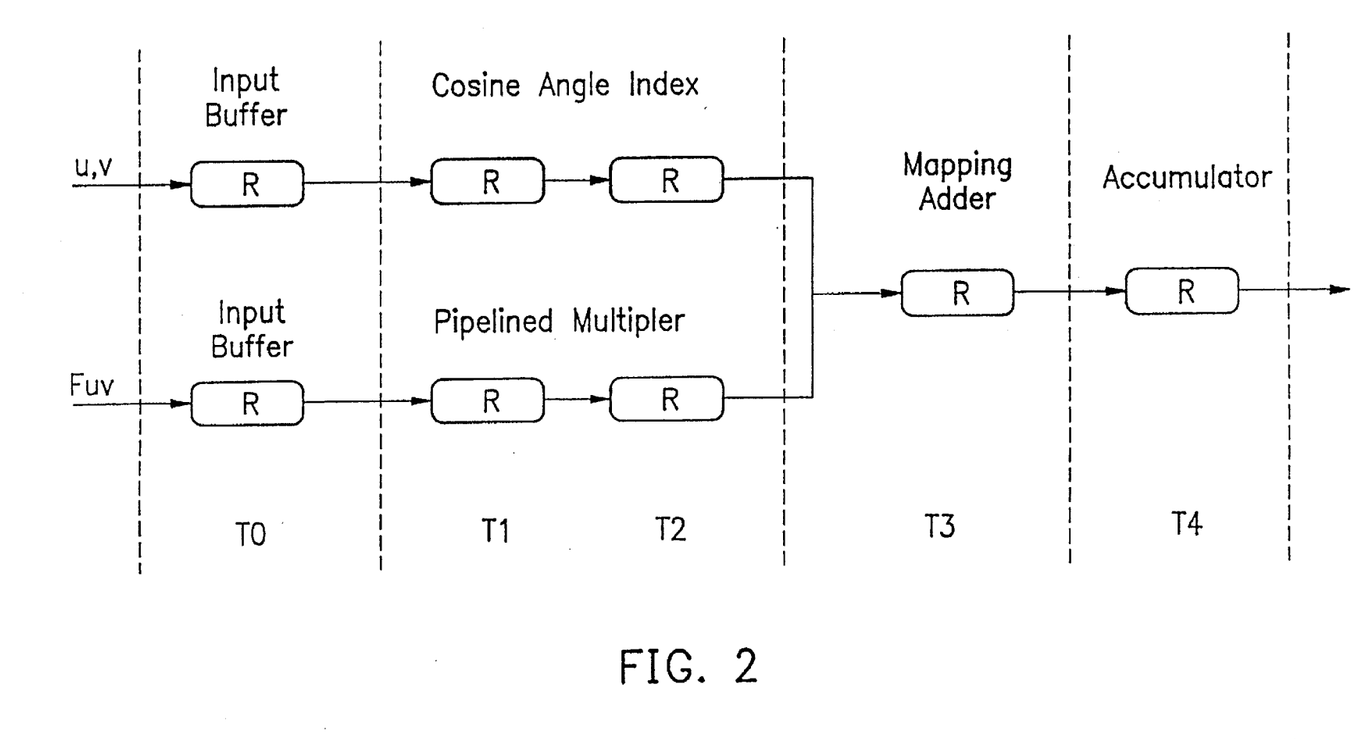
FIG. 2 is a schematic diagram of a five-stage pipelined structure for a 2-D IDCT processor according to the invention.

FIG. 2 shows a five stage pipelined structure according to the invention. The stages are denoted T0 . . . T4. A first stage T0 has coefficient $F_{uv}$ and its corresponding position {u,v} latched in input buffers. Next, data in the pipelined multiplier and the cosine angle index generators are processed through second and third stages T1 and T2. A fourth stage T3 has the results of the adders latched. The fifth (last) stage, T4, has the data accumulated in the accumulator. A clock rate of about 50 MHz can be obtained through five stage processing.

Figure 3:
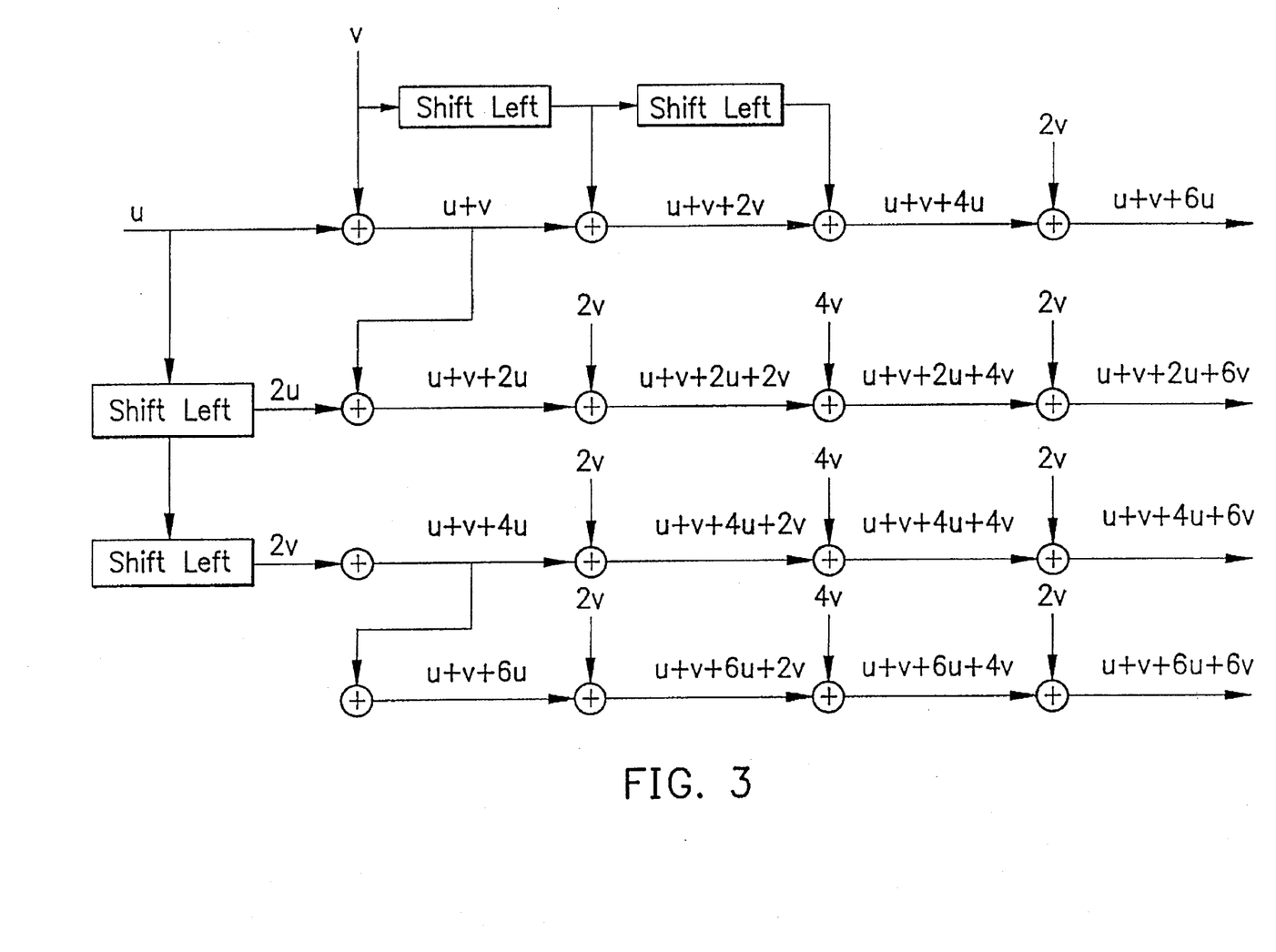
FIG. 3 is a schematic diagram of the architecture of a cosine angle index in a preferred embodiment of the invention.

Preferred structures of cosine angle index generators 13 and 15 will be described as follows.

In order to implement an IDCT chip of 8×8 block, 16 pairs of positive and negative angle indices, which are from terms (2j+1)u+(2k+1)v and (2j+1)u−(2k+1)v respectively, are needed. If we $$M_{+jk}{}^{uv}=(2j+1)u+(2k+1)v \tag{18}$$

and $$M_{-jk}{}^{uv}=(2j+1)u-(2k+1)v \tag{19}$$

two multipliers and three adders are needed to directly calculate the values of $M_{+jk}{}^{uv}$ and $M_{-jk}{}^{uv}$ in position i, j. Therefore, for the computation of $F_{uv}C_1{}^{uv}$, 16×2 multipliers and 16×3 adders are needed in total. A cross mapping method, which realizes $M_{+jk}{}^{uv}$ by the relative manner of neighboring angles, is presented to attain $M_{+jk}{}^{uv}$ and $M_{-jk}{}^{uv}$ by mapping circuits.

Since the indices generated by the generators begin with i=0 and j=0 and the first index is u+v in Eq.(18), the current position can be obtained by subtracting the previous position when the row position increases by one and the column position fixed. That is, the current position can be obtained from $$\{(2j+1)u+(2(k+1)+1)v\}-\{(2j+1)u+(2k+1)v\}=2v. \tag{20}$$

Therefore, as the row position increases by one, the relative angle index increases 2v elements. Similarly, as the column position increases by one, the relative angle index increases 2u elements. An efficient architecture for cosine angle index generation according to the aforementioned algorithm is illustrated in FIG. 3. The architecture for cosine angle index generation is a pipelined structure. Referring to FIG. 3, left shifting values u or v is added to the result of a pre-angle index. Through the pipelined structure, a last angle index of u+v+6v+6u with j=3 and k=3 is obtained and only 16×3-bit adders are used for the calculation of The simplification of the cosine angle indices will now be described. The cosine index $$\cos\left(\frac{\pi M_{+jk}^{uv}}{2N}\right)$$

in Eq. (12) can be simplified to cos (π16), cos (2π/16) , . . . , cos (7π/16) in an 8×8 block. If An is an original angle index and Xn is a simplified angle index, where n and m are bit numbers, the simplification steps are as follows (1) Since cos θ=cos (2π+θ), the angle index can be less than 32 when $M_{+jk}{}^{uv}$ is over 32. Thus, a 5-bit binary number is large enough to represent the angle index. That is, the number n can be five (5).

(2) If the fourth bit A3 is at a low level, and the fifth bit A4 represents a signed bit, the simplification of angle index can be directly obtained from A2 to A0.

(3) If the fourth bit A3 is at a high level, and the inverse of the fifth bit A4 represents a signed bit, the simplification of angle index can be obtained from two's complement Of A2 to A0.

Based on the above three steps, the signed output depends on the values of A3 and A4. When A3 and A4 are at different levels, the signed bit becomes high. The simplification of angle index can be written as $$X_{2-0} = \begin{cases} A_{2-0}, & \text{when } A_3 = 0 \\ 2\text{'s of } A_{2-0}, & \text{when } A_3 = 1 \end{cases} \quad (21)$$

and $$\text{signed bit} = A3.XOR.A4. \quad (22)$$

For example, if the five angle index bits A4~0 of $\cos(17\pi/16)$ are 1, 0, 0, 0 and 1, there will be simplified results with X2~0=0, 0, 1, signed bit=1 and $\cos(17\pi/16) = -\cos(\pi/16)$. If the angle bits A4~0 of $\cos(26\pi/16)$ are 1, 1, 0, 1 and 0, the simplified results will be X2~0 =1, 1, 0, signed bit=1 and $\cos(26\pi/16) = \cos(10\pi/16)$.

On the other hand, the negative angle index can be obtained from $M_{+jk}{}^{uv}$ by a cross mapping technique, thus simplifying the calculation. Suppose $$K = \frac{N}{2} - 1 - k$$

and J=j, where J and K are for $M_{-jk}{}^{uv}$, and j and k are for $M_{+jk}{}^{uv}$, Eq. (18) and (19) can be rewritten as $$\begin{aligned} M_{-jk}^{uv} &= (2J+1)u - (2K+1)v \quad (23) \\ &= (2j+1)u - \left(2\left(\frac{N}{2}-1-k\right)+1\right)v \\ &= M_{+jk}^{uv} - Nv. \end{aligned}$$

The difference between the negative and positive angle, referring to Eq.(23), is $Nv\pi$. Therefore, Eq. (13) can be rewritten as $$\cos\left(\frac{\pi M_{-jk}^{uv}}{2N}\right) = \cos\left(\frac{(M_{+jk}^{uv} - Nv)\pi}{2N}\right) = \quad (24)$$

$$\cos\left(\frac{\pi M_{+jk}^{uv}}{2N}\right)\cos\left(\frac{v\pi}{2}\right) + \sin\left(\frac{\pi M_{+jk}^{uv}}{2N}\right)\sin\left(\frac{v\pi}{2}\right)$$

Eq. (26) can be further simplified if an odd or even value v is assigned. Namely, (1) if v is an odd number, i.e., $$\cos\left(\frac{v\pi}{2}\right) = 0 \text{ and } \left|\sin\left(\frac{v\pi}{2}\right)\right| = 1,$$

Eq. (24) will be $$\cos\left(\frac{M_{-jk}^{uv}\pi}{2N}\right) = (-1)^{(v-1)/2}\sin\left(\frac{M_{+jk}^{uv}\pi}{2N}\right), \quad (25)$$

and the negative angle index can be obtained from two's complement of the positive angle index through the cross mapping; and (2) if v is an even number, i.e., $$\sin\left(\frac{v\pi}{2}\right) = 0 \text{ and } \left|\cos\left(\frac{v\pi}{2}\right)\right| = 1,$$

Eq. (24) will be $$\cos\left(\frac{M_{-jk}^{uv}\pi}{2N}\right) = (-1)^{v/2}\cos\left(\frac{M_{+jk}^{uv}\pi}{2N}\right), \quad (26)$$

and the negative angle index can be directly obtained from the positive angle index by means of the cross mapping.

Figure 4:
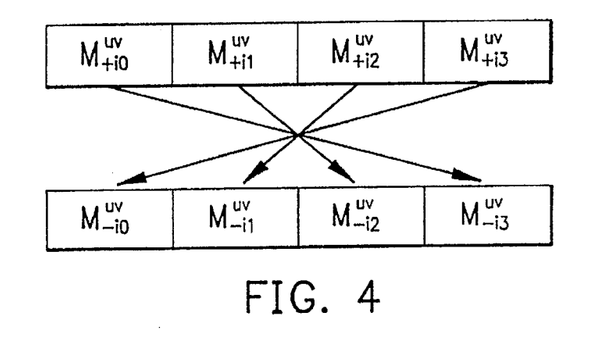
FIG. 4 is a schematic diagram showing the cross mapping for the negative angle index.
Figure 5:
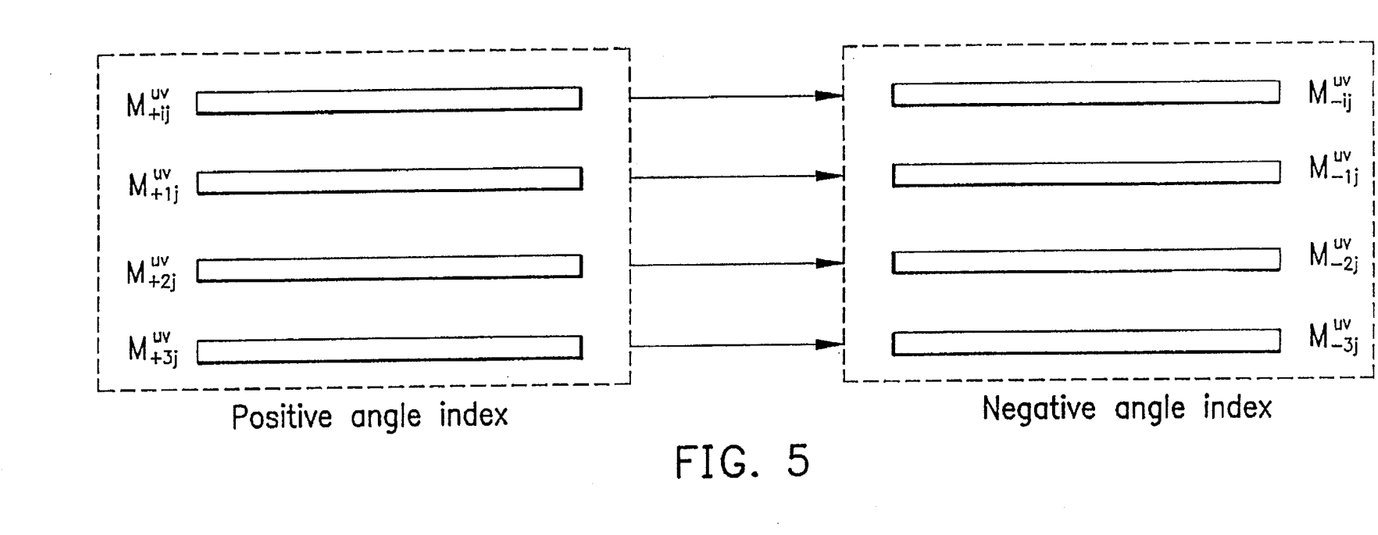
FIG. 5 is a schematic diagram showing a row by row cross mapping.

The cross mapping technique, shown in FIG. 4, has the negative angle index obtained from the positive angle index or its two's complement depending on the v value. Moreover, referring to FIG. 5, a row-by-row cross mapping structure is provided to increase the mapping efficiency. Therefore, a VLSI circuit generating 16 pairs of positive and negative angle indices can be easily implemented.

Figure 6:
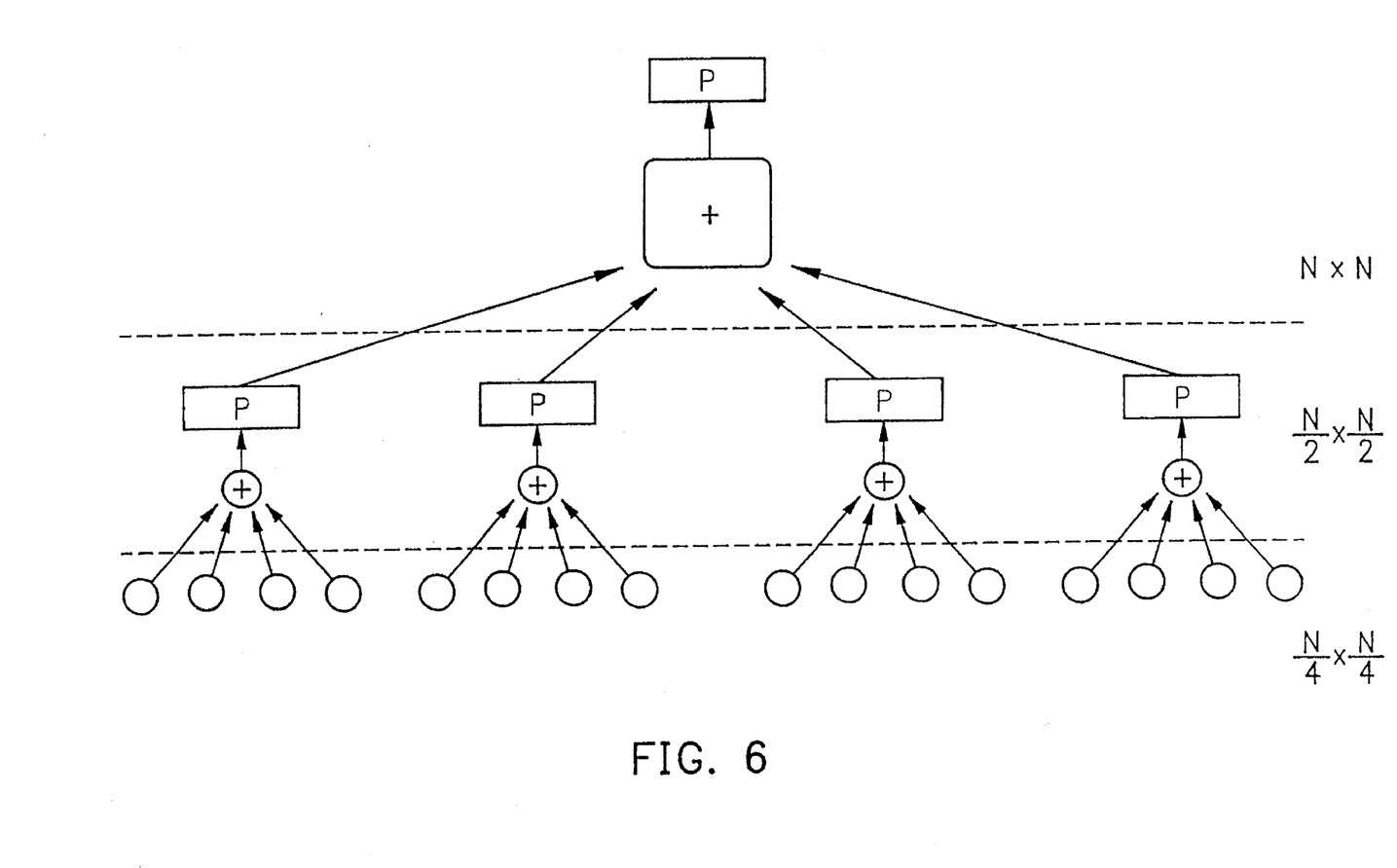
FIG. 6 is a tree structure for the pipelined multipliers in FIG. 1.

The pipelined multipliers, which process digital signals together with the cosine angle index generators, will now be discussed. Since the IDCT processor according to the invention requires four multipliers and a sequence of multipliers have a propagation delay which might affect the operating efficiency, the present invention provides a tree structure to design the pipelined multipliers. The three-stage tree structure, which has four branches in each of the lower two stages, is illustrated in FIG. 6. If X and Y are input data both having N bits, the hierarchical multiplier can be represented as $$\begin{aligned} XY &= \left(\sum_{i=0}^{N-1} X_i 2^i\right)\left(\sum_{i=0}^{N-1} Y_i 2^i\right) \quad (27) \\ &= \left(\sum_{i=0}^{N/2-1} X_{i+N/2} 2^i\right)\left(\sum_{i=0}^{N/2-1} Y_{i+N/2} 2^i\right) 2^N + \\ &\quad \left(\sum_{i=0}^{N/2-1} X_{i+N/2} 2^i\right)\left(\sum_{i=0}^{N/2-1} Y_i 2^i\right) 2^{N/2} + \\ &\quad \left(\sum_{i=0}^{N/2-1} X_i 2^i\right)\left(\sum_{i=0}^{N/2-1} Y_{i+N/2} 2^i\right) 2^{N/2} + \\ &\quad \left(\sum_{i=0}^{N/2-1} X_i 2^i\right)\left(\sum_{i=0}^{N/2-1} Y_i 2^i\right). \end{aligned}$$

Therefore, an N×N multiplier can be separated into four $$\frac{N}{2} \times \frac{N}{2}$$

multipliers according to Eq. (27). If the bit number N is 8 in the preferred embodiment of the present Invention, 16 2×2 multipliers will be basic cells when a three-stage hierarchical structure is employed.

Figure 7:
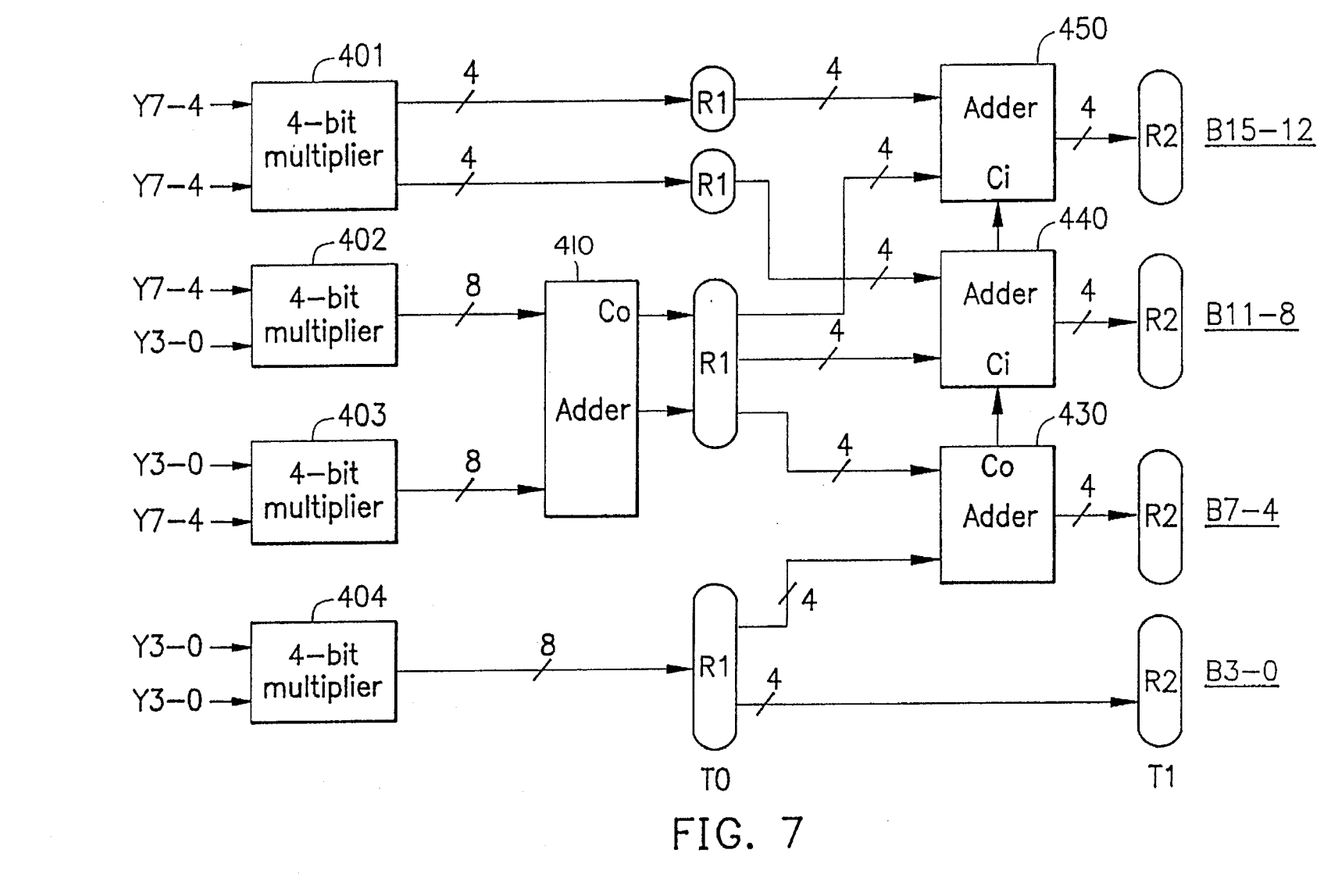
FIG. 7 is a schematic diagram showing a 8 by 8 two-stage configuration for the pipelined multipliers.

FIG. 7 shows a preferred structure of an 8×8 pipelined multiplier according to the invention. The pipelined multiplier comprises four 4×4 multipliers 401 to 404, adders 410, 430, 440 and 450, and a number of registers. Through a critical path of the 8×8 pipelined multiplier, the propagation delay is contributed by one of the 4×4 multipliers and an adder. Since the propagation delay of an N×N multiplier is in proportion to the dimension N×N, the total delay time of the pipelined multiplier is much less than that of a direct 8×8 multiplier.

The mapping module, that is, the kernel module of the IDCT processor, is a symmetrical kernel due to the symmetry properties in Eq. (5), (6) and (7). If Vs is the LSB (Least Significant Bit) of v, Us is the LSB of u, $T_{jk}$ is transformed data of a non-zero coefficient and $D_{jk}$ is accumulated data, a portion of Eq. (2) can be rewritten as $$D_{j,k} = \Sigma T_{jk}, j=0 \text{ to 3 and } k=0 \text{ to 3}. \quad (28)$$

And, if the symmetrical properties are considered, the remaining portion of Eq. (2) will be $$D_{j,7-k} = \begin{cases} \Sigma T_{jk} & \text{if } V_s = 0 \\ \Sigma(-T_{jk}) & \text{if } V_s = 1 \end{cases} \quad (29)$$

$$D_{7-j,k} = \begin{cases} \Sigma T_{jk} & \text{if } U_s = 0 \\ \Sigma(-T_{jk}) & \text{if } U_s = 1 \end{cases} \quad (30)$$

and $$D_{7-j,7-k} = \begin{cases} \Sigma T_{jk} & \text{if } V_s \oplus U_s = 0 \\ \Sigma(-T_{jk}) & \text{if } V_s \oplus U_s = 1 \end{cases} \quad (31)$$

Therefore, $D_{j,k}$, $D_{j,7-k}$, $D_{7-j,k}$ and $D_{7-j,7-k}$ are updated through Eq. (28) to (31) when the transformed data $T_{jk}$ is applied.

Figure 8:
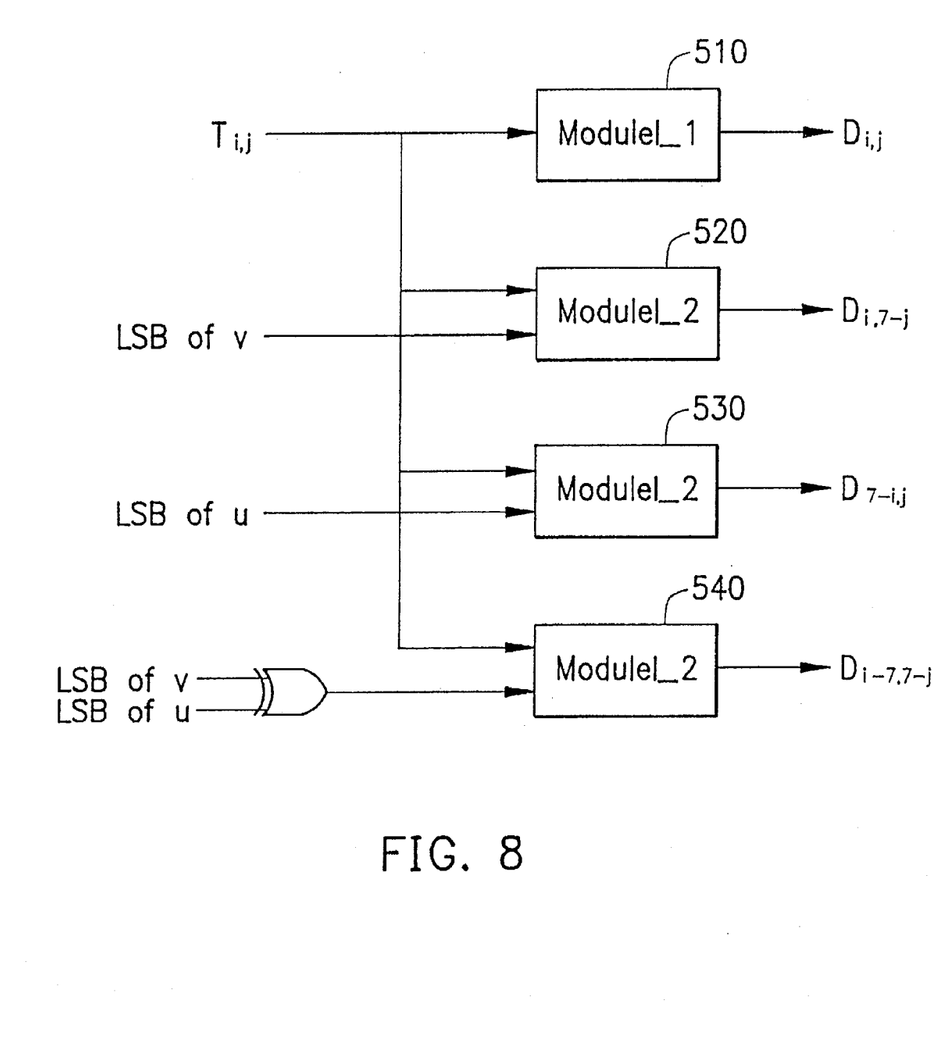
FIG. 8 is a schematic diagram showing a symmetrical kernel module.

A preferred structure of the symmetrical kernel module is illustrated in FIG. 8, wherein four sub-modules 510, 520, 530 and 540 have transformed data $T_{ij}$ as common input data and $D_{j,k}$, $D_{j,7-k}$, $D_{7-j,k}$ and $D_{7-j,7-k}$ as output data respectively. There are two different sub-module structures in the symmetrical kernel module, that is, module-1 and module-2.

Figure 9A:
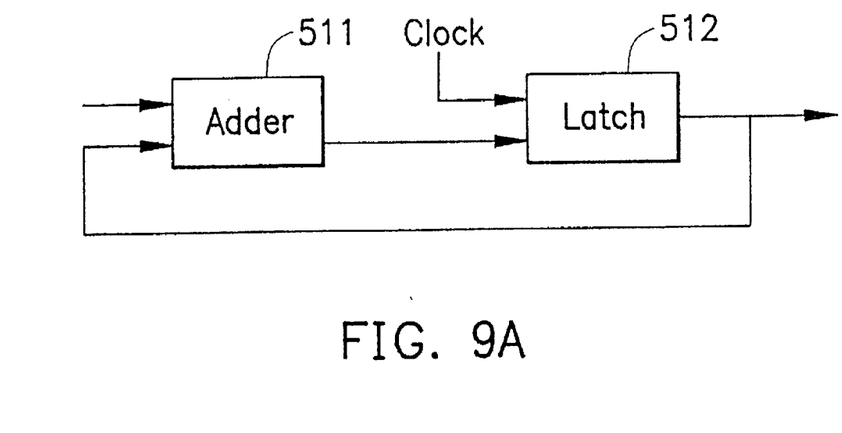
FIG. 9A is a block diagram of a module structure of FIG. 8.
Figure 9B:
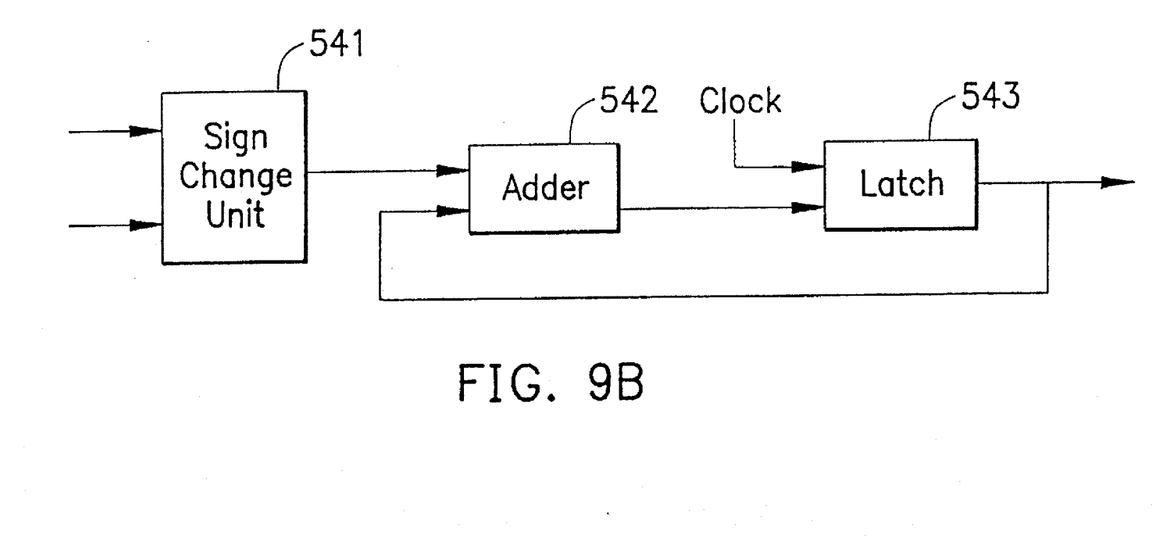
FIG. 9B is a block diagram of a module structure of FIG. 8.

Referring to FIG. 9A, sub-module 510, which is an accumulator having the module-1 structure, can be implemented using an adder 511 and a latch (or a register) 512 for the generation of $D_{j,k}$ according to Eq. (28). On the other hand, referring to FIG. 9B, module-2 sub-modules 520, 530 and 540 each comprise a sign change unit 541, an adder 542 and a latch 543 for the generation of $D_{j,7-k}$, $D_{7-j,k}$ and $D_{7-j,7-k}$ according to Eq. (29) to (31) respectively.

Figure 10:
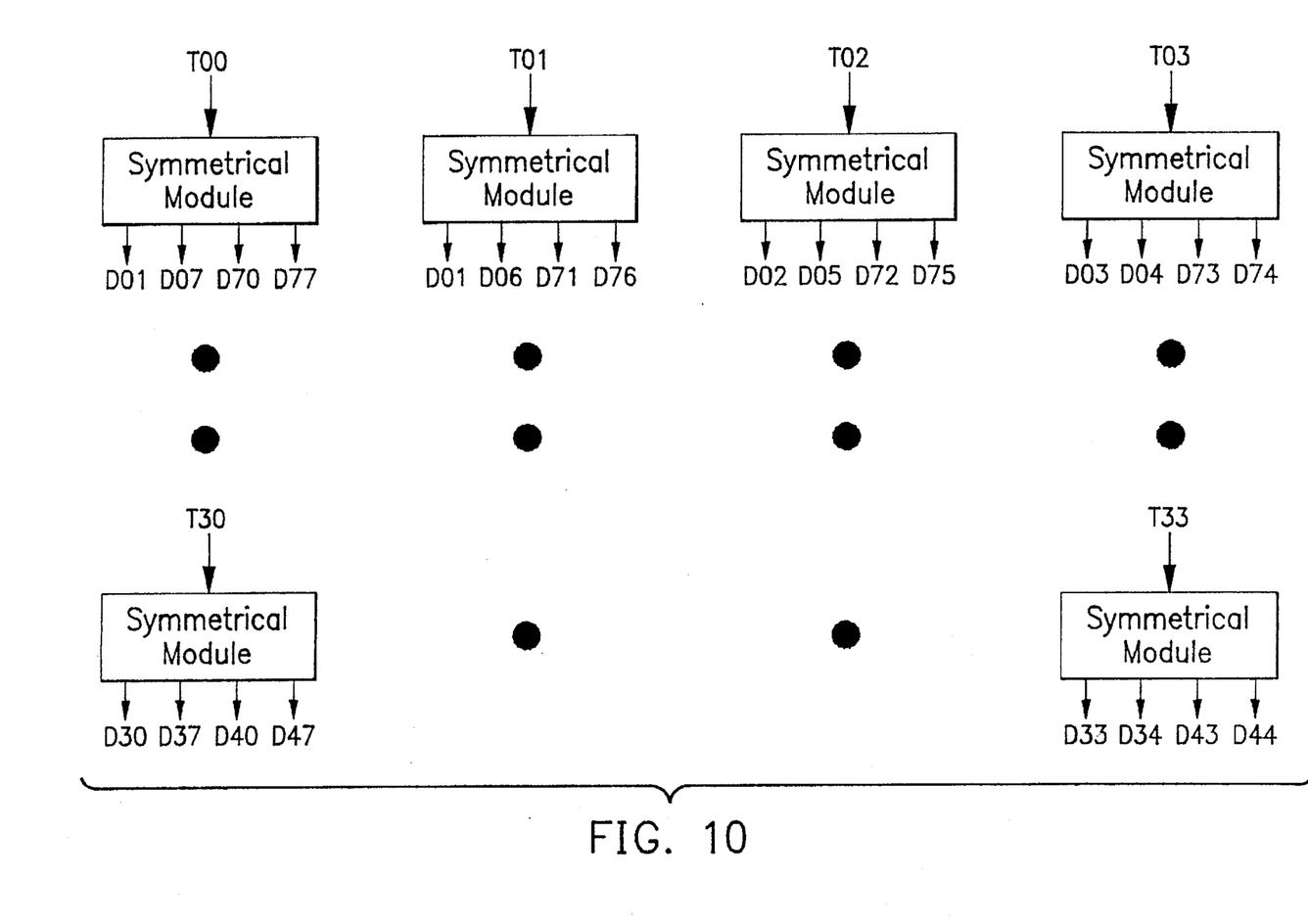
FIG. 10 illustrates a 4 by 4 array for the symmetrical kernel modules in FIG. 8.

Referring to FIG. 10, a complete symmetrical kernel includes 16 symmetrical modules of the type shown in FIG. 8. Through the 16 modules, 64 data $D_{j,k}$ with j=0 to 7 and k=0 to 7 will be obtained in one cycle time when 16 transformed data $T_{jk}$ are inputted.

Figure 11:
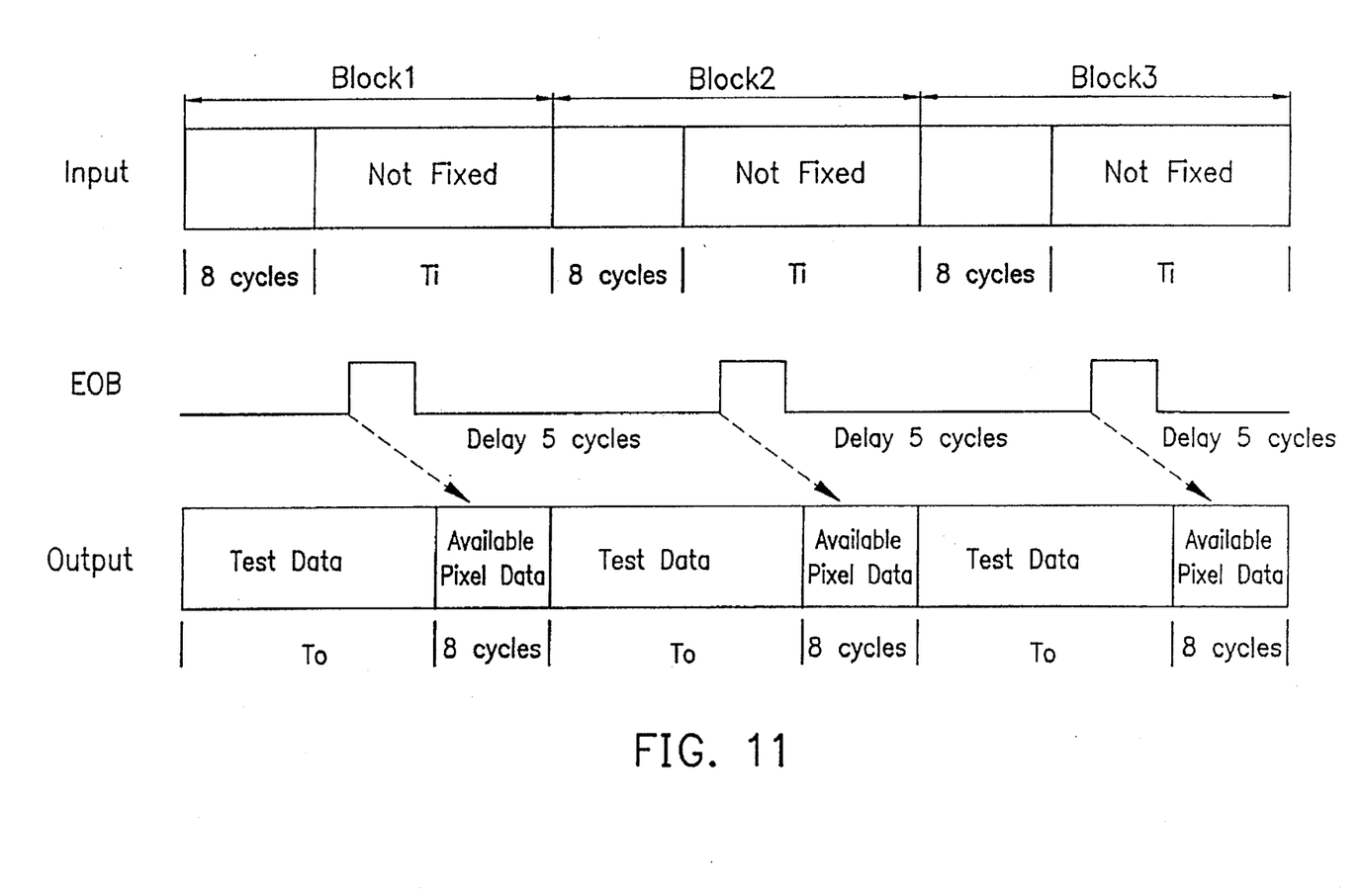
FIG. 11 is a timing diagram of the 2-D IDCT processor of the invention.

A timing diagram of the 2-D IDCT processor of the embodiment is illustrated in FIG. 11. Since only non-zero coefficients of the input matrix are transformed in the 2-D IDCT processor, the processing time of the input data is a variable. That is, if an 8×8 matrix is transformed, the processing time depends on the number of non-zero coefficients and varies within the range of 8 –64 clock time. But if the number of non-zero coefficients is less than 8, some zero coefficients should be added to make a total of eight coefficients. Thus, the input timing block 1 of FIG. 11 contains a period of eight cycles for non-zero or zero coefficients and an $T_i$ period varying from 0 to 56 cycles determined by the number of remaining non-zero coefficients. The output data will be obtained if an EOB signal having a high logic level is sent to the symmetrical kernel module. There is a five-cycle delay between the reception of the FOB signal and the data output, as shown in FIG. 11. The five-cycle delay is provided for the five-stage pipelined processing in which each stage has a processing time of one cycle. Then an eight-cycle data output is available at the eight output ports of the 2-D IDCT processor.

Figure 12A:
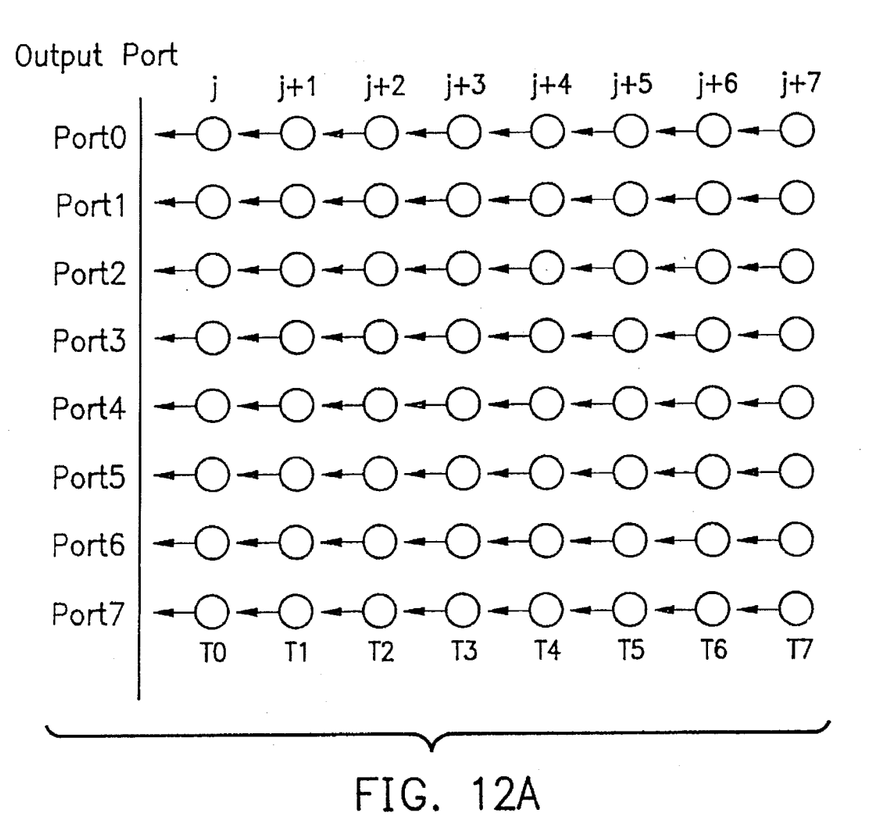
FIG. 12A is a schematic diagram showing a parallel output order with output elements.
Figure 12B:
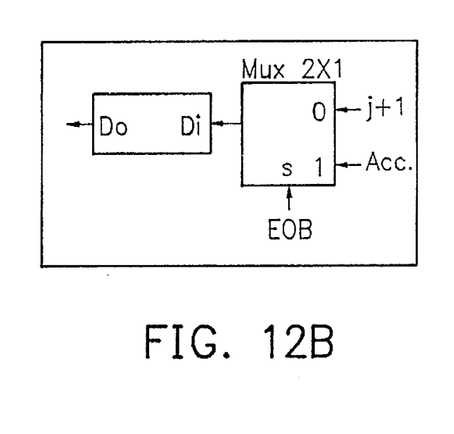
FIG. 12B illustrates the structure of an output element of FIG. 12A.

FIG. 12A illustrates a parallel output structure of the 2-D IDCT processor. The parallel output structure comprises N output buffers and each output buffer has N output elements. Referring to FIG. 12A, the eight output ports of the IDCT processor are provided by eight parallel output buffers. Each of the output buffers contains a plurality of output elements connected in series. A preferred structure of the output elements, shown in FIG. 12B, comprises a shift register and a multiplexer. The multiplexer selects the transformed result to the shift register by the controlling of the FOB signal. Through the N×N output elements, a column of N data is obtained in one clock cycle. Therefore, in N clock cycles, the total N×N transformed matrix can be obtained.

Figure 13:
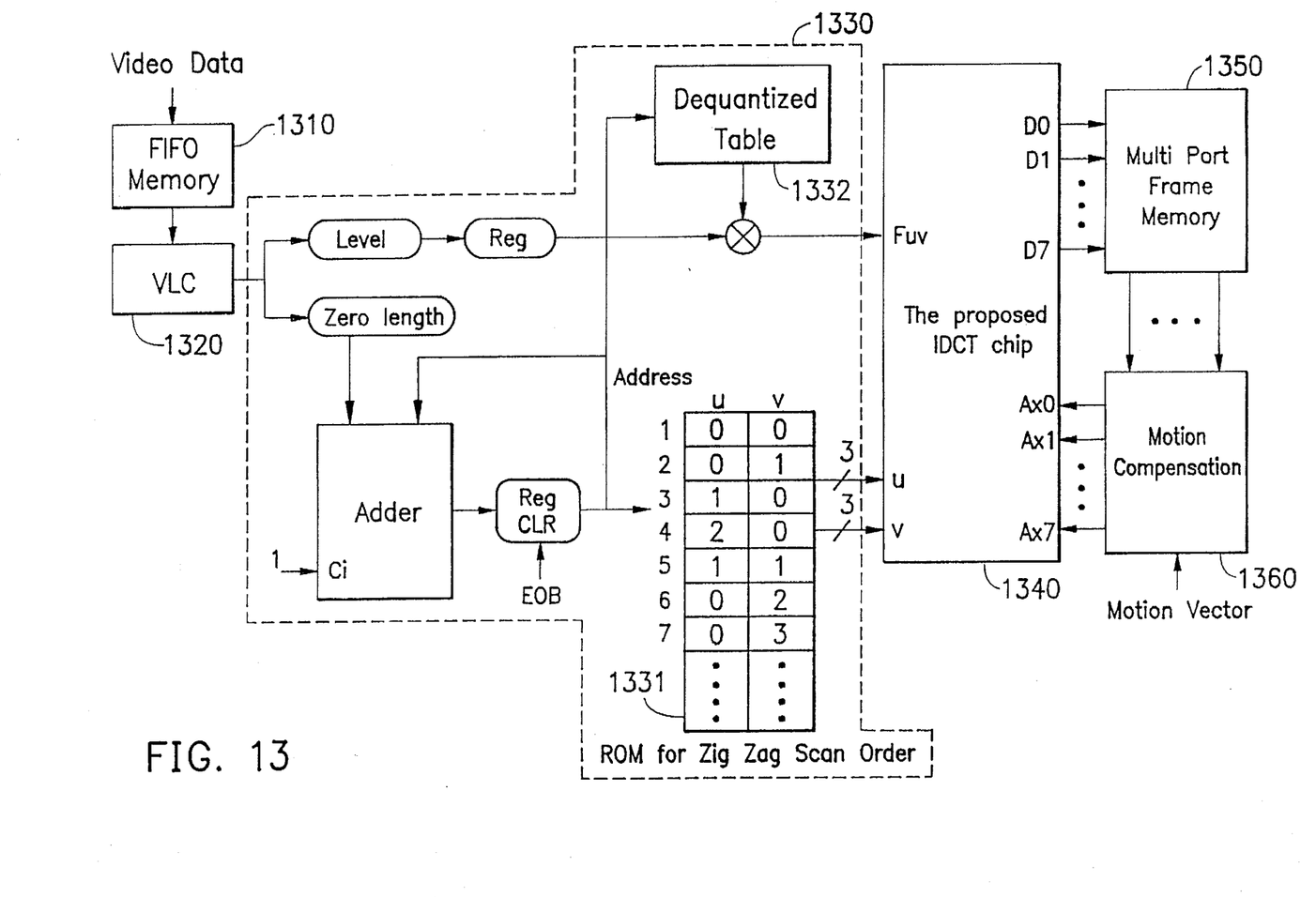
FIG. 13 is a functional block diagram illustrating an interface for the 2-D IDCT processor of the invention.

An illustrative application of the present invention in a video decoder is shown in FIG. 13. Of course, it should be understood that this is only one of many possible applications of the invention.

Referring to FIG. 13, the video decoder comprises a first-in-first-out (FIFO) memory 1310, a VLC (variable length coding) unit 1320, a dequantized processing unit 1330, an IDCT processor of the invention 1340, a multi-port frame memory 1350 and a motion compensation unit 1360. As shown in the drawing, the FIFO memory provides a constant input rate for the video data which is later processed in the VLC unit. Then a dequantized and a RLC (run length coding) process is carried out to obtain the input coefficients of the IDCT processor, i.e., $F_{uv}$, u and v. Moreover, 8 ports for post adding corresponding to output ports, are provided by the IDCT processor. As shown in the drawing, ports AX0 and AX6 are post-added to output port D0 and D6 respectively.

The address of a ROM 1331 and dequantized table 1332 in the RLC process can be expressed as Address=(Previous run length)+(Current run length)+1.

For example, if a zig/zag scan order is used, and a sequence from VLC unit is {98, (0, 3), (1,–5), (0, 2), (2, 1), (1,–3)}, the conventional video decoder has an input sequence of {98, 3, 0,–5, 2, 0, 0, 1, 0,–3, 0, 0, . . . , 0, 0, EOB}, while the present invention has the characteristics of

| Clock Time | Address | u | v | Coefficients |
|---|---|---|---|---|
| 1 | 1 | 0 | 0 | 98 |
| 2 | 2 | 0 | 1 | 3 |
| 3 | 4 | 2 | 0 | –5 |
| 4 | 5 | 1 | 1 | 2 |
| 5 | 8 | 2 | 1 | 1 |
| 6 | 10 | 3 | 0 | –3 |
| 7 | 0 | 0 | 0 | 0 |
| 8 | EOB. | | | |

Therefore, the conventional video decoder has to fill a lot of zeros into its input sequence through the RLC process, that is, N×N clock time is necessary for the processing of each data block, while the present invention uses only N clock time to process the same data block.

Moreover, since each IDCT coefficient is independently transformed and sequentially added in the accumulators, the IDCT processor of the present invention has progressive characteristics. That is, each IDCT coefficient progressively adds its detailed extents to the sum of a previous inverse result whenever the inverse process starts. Therefore, even though a few input coefficients are lost or erroneous, the intermediate results in the 2-D IDCT processor can still approximately represent the images if the IDCT coefficients are transmitted in the zig-zag scanning way. Thus, the IDCT processor will have a good performance in a fast scanning mode, which contains generally a fast forward and a fast backward searching mode, with maximal noise margins.

On the other hand, memory management has become a great challenge to the system designer since a large memory capacity is necessary for the HDTV system. Nevertheless, the application of the IDCT processor of the present invention in a HDTV system improves the operational speed by providing a high throughput rate, thus decreasing the need for a very large memory. That is, the memory management will be easier if the present invention is employed.

Furthermore, if motion compensation is provided in the video system, a cache memory for swapping in/out the frame memory is necessary. The parallel design in the present invention, even though operated at a low frequency, can carry out row-by-row processing to satisfy the high speed demand of the system. Thus, the required capacity of cache memory can be reduced.

Therefore, the 2-D IDCT processor of the present invention can accept any scanning order and have good progressive property. The IDCT process has a maximum pixel rate of 400 MHz when operated at a clock rate of 50 MHz. That is, a very high pixel rate can be obtained by a low frequency operation. On the other hand, all the elements described above can be fabricated in a semiconductor chip by conventional CMOS technology, thus facilitating its implementation.

What is claimed is:

1. A data processor which carries out a two-dimensional inverse discrete cosine transform (IDCT) for transforming data representing an N×N matrix into N×N transformed data, said processor comprising:
   a pipelined multiplier for multiplying a non-zero input coefficient of said N×N matrix with ROM data determined by coordinate parameters of said input coefficient;
   a cosine angle index generator for generating a positive angle index and a negative angle index from said coordinate parameters;
   a mapping module receiving said positive angle index and said negative angle index for generating one-coefficient-only results based on said positive and negative angle indices and output data from the pipelined multiplier;

$$\frac{N}{2} \times \frac{N}{2}$$

adders for summing said one-coefficient-only results;
   an accumulator for accumulating data from said adders and generating said N×N transformed data.

2. A data processor according to claim 1 having a five-stage pipelined structure which comprises an input buffer stage, two cosine angle index and pipelined multiplier stages, a mapping adder stage and an accumulator stage.

3. A data processor according to claim 1, wherein said pipelined multiplier has a hierarchical structure thereby reducing the dimension of each of said multipliers with respect to the dimension that would be necessary without a hierarchical structure.

4. A data processor according to claim 3, wherein said pipelined multiplier has a 3-stage hierarchical structure whose cell multiplier has a dimension of $$\frac{N}{4} \times \frac{N}{4}.$$

5. A data processor according to claim 1, wherein said cosine angle index generator comprises a positive angle index generator and a negative cosine angle index generator.

6. A data processor according to claim 5, wherein said cosine angle indices comprise a signed bit and are simplified.

7. A data processor according to claim 5, wherein said negative cosine angle index generator comprises means for generating, by cross mapping, negative cosine angle indices from positive cosine angle indices produced by said positive cosine angle index generator.

8. A data processor according to claim 1, wherein said accumulator kernel module comprises a first-type sub-module and three second-type sub-modules.

9. A data processor according to claim 8, wherein said first-type sub-module comprises an adder and a latch.

10. A data processor according to claim 8, wherein said second-type sub-module comprises a sign change unit, an adder and a latch.

11. A data processor according to claim 1 wherein said accumulator comprises a symmetrical kernel module array.

12. A data processor according to claim 1 further comprising a plurality of output buffers.

13. A data processor according to claim 12, wherein said output buffers comprise shift registers.

14. A data processor according to claim 1, further comprising means for obtaining said non-zero input coefficient from a variable-length coding unit.

15. A data processor according to claim 1, further comprising means for obtaining said coordinate parameters from run length values.

16. A data processor according to claim 12 further comprising a plurality of post adders connecting to said output buffers.

* * * * *